US008822595B2

(12) United States Patent
Bleys et al.

(10) Patent No.: US 8,822,595 B2
(45) Date of Patent: Sep. 2, 2014

(54) MIXTURE OBTAINED BY REACTING POLYOL AND ANHYDRIDE AND ITS USE IN POLYISOCYANATES FOR MAKING POLYISOCYANURATES

(75) Inventors: Gerhard Jozef Bleys, Heverlee (BE); Johan Robert Derluyn, Wezemaal (BE); Julien Devos, Boutersem (BE); Eric Huygens, B-Heverlee (BE); Hans Verbeke, Linden (BE); Luthgarde Alberta Marcella Geeraerts, legal representative, Boutersem (BE); Mathias Johan Richard Devos, legal representative, Rupelmonde (BE); Kristin Guillemine Irène Devos, legal representative, Halen (BE)

(73) Assignee: Huntsman International LLC, The Woodlands, TX (US)

( * ) Notice: Subject to any disclaimer, the term of this patent is extended or adjusted under 35 U.S.C. 154(b) by 251 days.

(21) Appl. No.: 13/058,295

(22) PCT Filed: Jul. 30, 2009

(86) PCT No.: PCT/EP2009/059874
§ 371 (c)(1),
(2), (4) Date: Feb. 9, 2011

(87) PCT Pub. No.: WO2010/023060
PCT Pub. Date: Mar. 4, 2010

(65) Prior Publication Data
US 2011/0237741 A1 Sep. 29, 2011

(30) Foreign Application Priority Data

Aug. 28, 2008 (EP) .................................... 08163167

(51) Int. Cl.
C08G 18/28 (2006.01)
C07C 69/76 (2006.01)
B32B 27/40 (2006.01)
C08G 73/06 (2006.01)
C08G 18/09 (2006.01)
C08G 18/22 (2006.01)
C08G 18/48 (2006.01)

(52) U.S. Cl.
CPC ........ *C08G 18/4887* (2013.01); *C08G 2105/02* (2013.01); *C08G 73/0655* (2013.01); *C08G 18/092* (2013.01); *C08G 18/225* (2013.01)
USPC ........................... 524/590; 560/89; 428/423.1

(58) Field of Classification Search
USPC ........................ 524/590; 560/89; 428/423.1
See application file for complete search history.

(56) References Cited

U.S. PATENT DOCUMENTS

| 4,039,487 A | 8/1977 | Kolakowski et al. |
| 4,110,135 A | 8/1978 | Graham et al. |
| 4,336,341 A | 6/1982 | Fujiwara et al. |
| 4,534,005 A | 8/1985 | Nagashima et al. |
| 4,540,781 A | 9/1985 | Barsa |
| 4,544,679 A * | 10/1985 | Tideswell et al. ............. 521/116 |
| 4,647,595 A | 3/1987 | Kozawa et al. |
| 4,710,521 A * | 12/1987 | Soukup et al. ................ 521/118 |
| 4,868,043 A | 9/1989 | Eling et al. |
| 5,489,663 A | 2/1996 | Brandt et al. |
| 5,563,180 A | 10/1996 | Skowronski et al. |
| 5,958,990 A | 9/1999 | Grimminger |
| 6,380,278 B1 | 4/2002 | Fan et al. |
| 6,432,864 B1 | 8/2002 | Wendel et al. |
| 6,509,392 B1 | 1/2003 | Jhaveri et al. |
| 2002/0045690 A1 | 4/2002 | Cheolas et al. |
| 2006/0084777 A1 | 4/2006 | Bleys et al. |
| 2008/0004361 A1 | 1/2008 | Palermo et al. |
| 2008/0227929 A1 | 9/2008 | Jozef et al. |
| 2008/0262168 A1 | 10/2008 | Bleys et al. |
| 2009/0005517 A1 | 1/2009 | Bleys et al. |
| 2009/0324932 A1 | 12/2009 | Laycock et al. |

FOREIGN PATENT DOCUMENTS

| EP | 294 161 | 12/1988 |
| EP | 304 005 | 2/1989 |
| GB | 1 531 070 | 11/1978 |
| GB | 2 064 567 | 6/1981 |
| GB | 2 288 182 | 10/1995 |
| JP | 57-131276 | 8/1982 |
| JP | 58-011529 | 1/1983 |
| JP | 58-034832 | 3/1983 |
| JP | 58-145431 | 8/1983 |
| JP | 60-90281 | 5/1985 |
| JP | 07 097557 | 4/1995 |
| WO | WO 2004/111101 | 12/2004 |
| WO | WO 2006/008780 | 1/2006 |
| WO | WO 2007/042407 | 4/2007 |
| WO | WO 2007/042411 | 4/2007 |
| WO | WO 2007/096216 | 8/2007 |
| WO | WO 2007/144291 | 12/2007 |

OTHER PUBLICATIONS

Woods, George, "Isocyanates", The ICI Polyurethanes Book, $2^{nd}$ Ed., 1990, pp. 32-35.

* cited by examiner

*Primary Examiner* — Aiqun Li
(74) *Attorney, Agent, or Firm* — Robert A. Diaz

(57) ABSTRACT

Isocyanurate-reactive mixture obtained by reacting an anhydride and a polyol; process for making it; polyisocyanate composition comprising this mixture; binder composition comprising such a polyisocyanate composition; the use of such a polyisocyanate composition and/or binder composition for making a polyisocyanurate and such polyisocyanurates.

13 Claims, No Drawings

MIXTURE OBTAINED BY REACTING POLYOL AND ANHYDRIDE AND ITS USE IN POLYISOCYANATES FOR MAKING POLYISOCYANURATES

CROSS-REFERENCE TO RELATED APPLICATIONS

This application is the National Phase of International Application PCT/EP2009/059874 filed Jul. 30, 2009 which designated the U.S. and which claims priority to European App. Serial No. 08163167.3 filed Aug. 28, 2008. The noted applications are incorporated herein by reference.

The present invention relates to a polyisocyanate composition useful for making a polyisocyanurate and a process for making such a polyisocyanate which comprises combining a polyisocyanate and an ester composition. Processes for making polyisocyanurates have been described in WO 2006/008780, JP 58-034832, JP 58-145431, JP 58-011529 and JP 57-131276.

US 2002/0045690, WO 04/111101, WO 07/42407, WO 07/42411, WO 07/96216 and WO 07/144,291 all disclose processes to make a polyisocyanurate from a polyisocyanate, a certain polyol and a trimerization catalyst by reacting the polyisocyanate and the polyol at a high index.

U.S. Pat. No. 6,509,392 discloses a binder comprising a polyether polyol component, a polyisocyanate component and a trimerization catalyst. The binder is used for making foundry shapes using the no-bake process.

EP 304005 discloses a process for making fiber reinforced articles using a binder comprising a polyisocyanate, a polyether polyol and a trimerization catalyst.

U.S. Pat. No. 6,432,864 discloses acid-blocked amine catalysts made by reacting an anhydride with an alcohol at elevated temperature followed by addition of an amine. The catalysts are used to make polyurethanes.

U.S. Pat. No. 4,110,135 discloses compositions enabling the control of the curing rate profile of polyurethane resin systems. The compositions comprise a metallo organic compound and a carboxylic acid or a compound convertible thereto, like an anhydride. The metallo organic compounds are preferably derived from the metals bismuth, lead, tin, arsenic or zinc and from the organic moieties phenyl, tolyl, benzyl, naphthyl, lower alkyl of 1 to 20 carbon atoms, or cycloalkyl of 5 to 20 carbon atoms.

EP 294161 discloses the preparation of semi-rigid polyurethane foam using compounds which may be prepared by reacting an alcohol with an anhydride.

GB 2064567 and U.S. Pat. No. 4,336,341 disclose the preparation of polyisocyanurate foam by reacting a polyisocyanate with an anhydrous reaction product of a dibasic acid anhydride and a partially alcoholated polyether polyol with an alkali metal hydroxide and/or alkaline earth metal hydroxide.

U.S. Pat. No. 5,958,990 discloses a method for making polyurethane/polyisocyanurate foam by reacting a polyisocyanate and a polyol in the presence of a trimerization catalyst, a urethane catalyst, a blowing agent and a surfactant wherein the trimerization catalyst is a salt of the reaction product of an organic acid anhydride and an amine.

U.S. Pat. No. 4,540,781 discloses the use of a certain trimerization catalyst for making polyisocyanurates by means of resin transfer moulding. The catalysts are carboxylic acid salts, like the salt of a substituted half-ester of malonic acid. These salts act as normal trimerization catalysts: by increasing the amount of this catalyst the pot life will decrease. Further, producing half-esters from malonic anhydride is cumbersome since malonic acid easily decarboxylates upon heating before forming the anhydride.

GB 1531070 and GB 2288182 disclose the use of polyester polyols made from aromatic anhydrides in preparing polyisocyanurate foams.

JP-A-6090281 discloses the use of systems for making thermosetting adhesives consisting of a high molecular weight polyol, a polyisocyanate, a trimerization catalyst and, if desired, a solvent.

This system, giving polyisocyanurates, has a long operability time and a shorter curing compared to conventional polyurethane systems.

JP-A-07-97557 discloses solventless composite laminate adhesive compositions using an isocyanate-reactive mixture obtained by reacting trimellitic anhydride with a polyol at a temperature of 200° C.

The reaction between phthalic anhydride and an alcohol at 130-150° C. in the absence of a catalyst is described as fast in a not-dated brochure of Dupont which relates to TYZOR$^R$ titanate catalysts for preparing plasticizers like dioctyl phthalate.

Surprisingly we have now found that the trimerization reaction of the polyisocyanate can be delayed by using a certain composition. Such a delay of the reaction is particularly desirable when products are to be made according to processes which require an extended processing time like in the case of resin transfer moulding (RTM) or which require prewetting of other materials with the polyisocyanate composition like in pultrusion, prepreg composite applications, sheet moulding and filament winding or when a longer potlife in general is desired. In all these processes a one-component composition is used which needs a certain degree of stability for a certain period of time during which no or little reaction occurs at ambient conditions in order to allow such compositions to be handled in such processes.

Another feature of the present invention is that after the polyisocyanate composition starts to react or is allowed to react, the reaction is very fast and exothermic (so called snap-cure).

A further feature of the present invention is that the trimerization catalyst also serves as catalyst in the preparation of the composition providing the delay of the trimerization reaction.

Therefore the present invention relates to an isocyanate-reactive mixture comprising a trimerization catalyst and obtained by reacting phthalic anhydride and/or trimellitic anhydride with a polyol having an average equivalent weight of 100-2500 and an average nominal hydroxyl functionality of 2-8, in such amounts that the molar amount of the anhydride ranges from 0.1 to 99% of the hydroxyl equivalent amount of the polyol, wherein the ratio of the number of carboxylic acid groups to the number of ester groups, both formed in the reaction between the anhydride groups and the polyol, is 0.9-1.1 to 1 and wherein at least 60% of the anhydride groups has been converted. Further the present invention relates to a process for preparing such an isocyanate-reactive mixture wherein the anhydride and the polyol are reacted at ambient pressure and at a temperature of 10-140° C. in the presence of the trimerization catalyst.

Further the present invention relates to a polyisocyanate composition comprising a polyisocyanate and such an isocyanate-reactive mixture in such relative amounts that the index is 150-15000 and still further to a binder composition comprising such a polyisocyanate composition and a material which is to be bonded, wherein the amount of the material which is to be bonded is 0.01-100 times the amount of the polyisocyanate composition on a weight basis and to the use of such a polyisocyanate composition and/or binder composition for making a polyisocyanurate and to polyisocyanurates made from above polyisocyanate compositions and/or from such binder compositions.

In the context of the present invention the following terms have the following meaning:

1) isocyanate index or NCO index or index:
   the ratio of NCO-groups over isocyanate-reactive hydrogen atoms from polyols having an equivalent weight of 100-2500 present in a composition, given as a percentage:

$$\frac{[NCO] \times 100}{[\text{active hydrogen}]} (\%),$$

with the proviso that the amount of this polyol in the ester composition (the isocyanate-reactive mixture according to the present invention) is taken into account, reacted or not.

In other words the NCO-index expresses the percentage of isocyanate actually used in a composition with respect to the amount of isocyanate theoretically required for reacting with the amount of isocyanate-reactive hydrogen from said polyols used in a composition, with the proviso that the amount of this polyol in the ester composition (the isocyanate-reactive mixture according to the present invention) is taken into account, reacted or not.

It should be observed that the isocyanate index as used herein is considered from the point of view of the actual polymerisation process preparing the material involving the isocyanate and the polyol. Any isocyanate groups consumed in a preliminary step to produce modified polyisocyanates (including such isocyanate-derivatives referred to in the art as prepolymers) are not taken into account in the calculation of the isocyanate index. Only the free isocyanate groups and the free isocyanate-reactive hydrogens (of said polyols) present at the actual polymerisation stage are taken into account, with the proviso that the amount of this polyol in the ester composition (the isocyanate-reactive mixture according to the present invention) is taken into account, reacted or not.

2) The expression "isocyanate-reactive hydrogen atoms" as used herein for the purpose of calculating the isocyanate index refers to the total of active hydrogen atoms in hydroxyl groups present in the polyol; this means that for the purpose of calculating the isocyanate index at the actual polymerisation process one hydroxyl group is considered to comprise one reactive hydrogen.

3) The expression "polyisocyanurate" as used herein refers to cellular or non-cellular products as obtained by reacting the mentioned polyisocyanates and polyols in the presence of trimerization catalysts at an index of 150-15000.

4) The term "average nominal hydroxyl functionality" is used herein to indicate the number average functionality (number of hydroxyl groups per molecule) of the polyol or polyol composition on the assumption that this is the number average functionality (number of active hydrogen atoms per molecule) of the initiator(s) used in their preparation.

5) The word "average" refers to number average unless indicated otherwise.

6) Trimerization catalyst: a catalyst promoting the formation of isocyanurate groups from polyisocyanates.

7) The "hydroxyl equivalent amount of a polyol" is the number of moles of said polyol multiplied with the average nominal hydroxyl functionality of said polyol.

Phthalic anhydride and/or trimellitic anhydride are used in the present invention; phthalic anhydride being most preferred. The molar amount of these anhydrides ranges from 0.1 to 99%, preferably from 0.2 to 50% and most preferably from 0.3 to 30% of the hydroxyl equivalent amount of the polyol.

The polyols used having an average equivalent weight of 100-2500 and an average nominal hydroxyl functionality of 2-8 may be selected from polyester polyols, polyether polyols, polyester-amide polyols, polycarbonate polyols, polyacetal polyols and mixtures thereof. Preferably polyether polyols are used, like polyoxyethylene polyols, polyoxypropylene polyols, polyoxybutylene polyols and polyether polyols comprising at least two different oxyalkylene groups, like polyoxyethylene polyoxypropylene polyols, and mixtures thereof. Polyols comprising at least two different oxyalkylene groups may be block copolymers or random copolymers or combinations thereof.

The most preferred polyether polyols used have an average nominal hydroxyl functionality of 2-4, an average equivalent weight of 100-2500, an oxyethylene content of at least 50% by weight and preferably of at least 65% by weight (on the weight of the polyether polyol). More preferably such polyether polyols have a primary hydroxyl group content of at least 40% and more preferably of at least 65% (calculated on the number of primary and secondary hydroxyl groups). They may contain other oxyalkylene groups like oxypropylene and/or oxybutylene. Mixtures of these most preferred polyols may be used. No other polyols or other isocyanate-reactive compounds (than these most preferred polyether polyols) having an average equivalent weight of 100-2500 are used preferably. Such polyols are known in the art and commercially available; examples are Caradol™ 3602 from Shell, Daltocel™ F526, F442, F444 and F555 and Jeffox™ WL 440, WL 590 and WL 1400 from Huntsman.

Jeffox, Daltocel and Suprasec are trademarks of Huntsman Corporation or an Affiliate thereof which have been registered in at least one but not all countries.

The isocyanate-reactive mixture is prepared by combining the polyol, the anhydride and the catalyst in any order, mixing and reacting the polyol and the anhydride in the presence of the trimerization catalyst. In the isocyanate-reactive mixture the amount of the trimerization catalyst may range from 0.002-5 and preferably from 0.005-2% by weight calculated on the weight of the isocyanate-reactive mixture.

It may occur that the polyol still contains carboxylate salts which were formed during the polyol preparation and which happen to enhance formation of polyisocyanurate groups from polyisocyanates. In such a case no or less additional trimerization catalyst needs to be added.

The reaction is conducted at ambient pressure and at a temperature ranging from 10 to 140° C. and preferably from 10° C. to 100° C. for a period of time which is sufficient to convert at least 60% and preferably at least 80% and most preferably at least 90% of the anhydride groups, the free anhydride content being determined by $C^{13}$-NMR.

A time between 1 minute and 24 hours and preferably between 2 minutes and 8 hours generally will be sufficient to obtain such a conversion level. During this preparation no water is removed from the reacting mixture (since it is not formed). Apart from the trimerization catalyst, no other catalysts and preferably no other ingredients are present during the preparation of the isocyanate-reactive mixture according to the present invention.

The trimerization catalyst is a carboxylate, the carboxylate group having 1-12 carbon atoms.

Such catalysts are selected from alkali metal carboxylates, quaternary ammonium carboxylates and mixtures thereof, the carboxylate group having 1-12 carbon atoms. Most preferred are potassium acetate, potassium hexanoate, potassium ethylhexanoate, potassium octoate, potassium lactate, N-hydroxypropyl trimethyl ammonium octoate, N-hydroxypropyl trimethyl ammonium formate and mixtures thereof. Catalysts of this type are commercially available; examples are Catalyst LB (comprising potassium acetate) from Huntsman and Dabco K15 (comprising potassium octoate) or Dabco TMR of Air Products.

The isocyanate-reactive mixture according to the present invention is subsequently added to the polyisocyanate or the other way around so as to prepare the polyisocyanate composition according to the present invention.

The relative amounts of the polyisocyanate and the isocyanate-reactive composition are such that the index is 150-15000 and preferably 250-9000.

The polyisocyanate may be chosen from aliphatic, cycloaliphatic, araliphatic and, preferably, aromatic polyisocyanates, such as toluene diisocyanate in the form of its 2,4 and 2,6-isomers and mixtures thereof, diphenylmethane diisocyanates and variants thereof, and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate, diphenylmethane diisocyanates and/or polymethylene polyphenylene polyisocyanates may be used as well.

Preferably the polyisocyanate consists of a) 70-100% and more preferably 80-100% by weight of diphenylmethane diisocyanate comprising at least 40%, preferably at least 60% and most preferably at least 85% by weight of 4,4'-diphenylmethane diisocyanate and/or a variant of said diphenylmethane diisocyanate which variant has an NCO value of at least 10% by weight (polyisocyanate a), and b) 30-0% and more preferably 20-0% by weight of another polyisocyanate (polyisocyanate b).

Preferably this polyisocyanate a) is selected from 1) a diphenylmethane diisocyanate comprising at least 40%, preferably at least 60% and most preferably at least 85% by weight of 4,4'-diphenylmethane diisocyanate and the following preferred variants of such diphenylmethane diisocyanate: 2) a carbodiimide and/or uretonimine modified variant of polyisocyanate 1), the variant having an NCO value of 10% by weight or more; 3) a urethane modified variant of polyisocyanate 1), the variant having an NCO value of 10% by weight or more and being the reaction product of an excess of polyisocyanate 1) and of a polyol having an average nominal hydroxyl functionality of 2-4 and an average molecular weight of at most 1000; 4) a prepolymer having an NCO value of 10% by weight or more and which is the reaction product of an excess of any of the aforementioned polyisocyanates 1-3) and of a polyol having an average nominal functionality of 2-6, an average molecular weight of 2000-12000 and preferably an hydroxyl value of 15 to 60 mg KOH/g, and 5) mixtures of any of the aforementioned polyisocyanates. Polyisocyanates 1) and 2) and mixtures thereof are preferred. Polyisocyanate 1) comprises at least 40% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec™ 1306 ex Huntsman.

The carbodiimide and/or uretonimine modified variants of the above polyisocyanate 1) are also known in the art and commercially available; e.g. Suprasec 2020, ex Huntsman. Urethane modified variants of the above polyisocyanate 1) are also known in the art, see e.g. The ICI Polyurethanes Book by G. Woods 1990, $2^{nd}$ edition, pages 32-35. Aforementioned prepolymers of polyisocyanate 1) having an NCO value of 10% by weight or more are also known in the art. Preferably the polyol used for making these prepolymers is selected from polyester polyols and polyether polyols and especially from polyoxyethylene polyoxypropylene polyols having an average nominal functionality of 2-4, an average molecular weight of 2500-8000, and preferably an hydroxyl value of 15-60 mg KOH/g and preferably either an oxyethylene content of 5-25% by weight, which oxyethylene preferably is at the end of the polymer chains, or an oxyethylene content of 50-90% by weight, which oxyethylene preferably is randomly distributed over the polymer chains.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec 2021 ex Huntsman.

The other polyisocyanate b) may be chosen from aliphatic, cycloaliphatic, araliphatic and, preferably, aromatic polyisocyanates, such as toluene diisocyanate in the form of its 2,4 and 2,6-isomers and mixtures thereof and oligomers of diphenylmethane diisocyanate (MDI) having an isocyanate functionality greater than 2. Mixtures of MDI and these oligomers are known in the art as "crude" or polymeric MDI (polymethylene polyphenylene polyisocyanates). Mixtures of toluene diisocyanate and polymethylene polyphenylene polyisocyanates may be used as well.

When polyisocyanates are used which have an NCO functionality of more than 2, the amount of such polyisocyanate used is such that the average NCO functionality of the total polyisocyanate used in the present invention is 2.0-2.2, preferably. The polyisocyanates used in the present invention preferably are liquid at 20° C.

The combining and mixing of the polyisocyanate and the other ingredients preferably is to be conducted at ambient pressure and at a temperature between 5° C. and 45° C. and more preferably between 5° C. and 30° C. in order to avoid undesired premature reactions as much as possible.

This polyisocyanate composition may be used to prepare a polyisocyanurate. This is preferably done by elevating the temperature, more preferably to 50-350° C. and most preferably to 70-280° C.

The polyisocyanate composition according to the present invention may be used to bind one or more materials, hereinafter referred to as "to-be-bonded material". The present invention is further concerned with a binder composition comprising the polyisocyanate composition according to the present invention together with a material which is to be bonded.

The binder composition can be left at room temperature for a time which is sufficient for its further use without seriously affecting its further processability during this period of time. This binder composition has a low reactivity at ambient conditions and may also be stored at lower temperatures, e.g. −50° C. to +10° C. and preferably of −30° C. to 0° C.

The to-be-bonded material may have any size and shape. The to-be-bonded materials preferably are solid materials at room temperature. Examples of materials which may be used are:
- wood chips, wood dust, wood flakes, wooden plates;
- paper and cardboard, both shredded or layered;
- sand, vermiculite, clay, cement and other silicates;
- ground rubber, ground thermoplastics, ground thermoset materials;
- honey combs of any material, like cardboard, aluminium, wood and plastics;
- metal particles and plates;
- cork in particulate form or in layers;
- natural fibers, like flax, hemp and sisal fibers;
- synthetic fibers, like polyamide, polyolefin, polyaramide, polyester and carbon fibers;
- foamed materials like polyurethane, polyisocyanurate and polystyrene foams in the form of layers, pieces or crumbs;
- mineral fibers, like glass fibers, carbon fibers and rock wool fibers;
- mineral fillers like $BaSO_4$ and $CaCO_3$;
- nanoparticles, like clays, inorganic oxides and carbons;
- glass beads, ground glass, hollow glass beads;
- expanded or expandable beads, like Expancel™ beads or similar microspheres;
- untreated or treated waste, like milled, chopped, crushed or ground waste and in particular fly ash;
- woven and non-woven textiles; and
- combinations of two or more of these materials.

The combining of the polyisocyanate composition and the to-be-bonded material preferably is conducted under ambient conditions and may be conducted by coating, impregnating, laminating, pouring, kneeding, calendering, extruding, mixing and spraying of the polyisocyanate composition and combinations thereof and/or any other suitable way which ensures thorough contact between the polyisocyanate composition and the to-be-bonded material.

The amount of the to-be-bonded material may vary from 0.01 to 100 and preferably from 0.5 to 20 and most preferably from 2 to 10 times the amount of polyisocyanate composition (on a weight basis).

Optionally further ingredients may be used in the polyisocyanate and binder composition according to the present invention like blowing agents, catalysts enhancing the formation of urethane bonds, like tin catalysts like tin octoate and dibutyltindilaurate, tertiary amine catalysts like triethylenediamine and imidazoles like dimethylimidazole; surfactants; fire retardants; smoke suppressants; UV-stabilizers; colorants; microbial inhibitors; degassing and defoaming agents; plasticizers and internal mould release agents.

Still further isocyanate-reactive chain extenders and cross-linkers having an average equivalent weight below 100 may be used, like ethylene glycol, diethylene glycol, propylene glycol, dipropylene glycol, butane diol, hexane diol, glycerol, trimethylol propane, sucrose and sorbitol. These chain extenders and cross-linkers preferably are not used or only to the extent as necessary in view of the fact that commercial grades of catalyst may contain such chain extenders and/or cross linkers. If used these chain extenders and/or cross linkers are not taken into account in calculating the aforementioned index: additional polyisocyanate is to be used to compensate for the active hydrogens in these chain extenders and cross-linkers.

Once the polyisocyanate and/or the binder composition according to the present invention has been prepared it may be allowed to react, preferably at an elevated temperature so as to form a polyisocyanurate; this next step is more preferably conducted at a temperature between 50° C. and 350° C. and most preferably between 70° C. and 280° C. This reaction may take between 5 seconds and 10 hours and preferably takes between 15 seconds and 2 hours. The process may be conducted at ambient pressure or at reduced or elevated pressure.

When a moulding process is used, the polyisocyanate and/or binder composition may be made outside the mould and subsequently be put in the mould, followed by closing and heating the mould and allowing the composition to react so as to form the polyisocyanurate. Alternatively the binder composition may be made in the mould by combining the polyisocyanate composition and the to-be-bonded material in the mould to form the binder composition and then to close the mould and elevate the temperature or elevate the temperature and close the mould.

The polyisocyanate and/or the binder composition may be applied onto a backing outside or inside a mould or a cover may be applied onto the binder composition or both a backing and a cover may be applied in which case a sandwich composite is obtained. The backing and the cover may be the same or different materials. The polyisocyanate and/or the binder composition may be applied onto both sides of a backing. Another way of making such backed composites is to apply the to-be-bonded material onto the backing followed by combining the polyisocyanate composition with the to-be-bonded material e.g. by spraying.

If a moulding process is used it preferably may be conducted according to the cast moulding process, the compression moulding process, the resin transfer moulding process, especially the vacuum assisted one, the resin infusion process, the prepregging process and the hand lay-up process.

The process further may be conducted according to an injection-, an extrusion- or a pultrusion process. Microwave or induction curing may also be applied. The process may be conducted batch-wise, semi-continuously or continuously.

The present invention is illustrated with the following examples.

EXAMPLES 1-15

Mixtures were made using 85 parts by weight of Suprasec 2020, 15 parts by weight of polyol, trimerization catalyst and anhydride (when used).

The mixtures were made by adding the anhydride to the polyol, followed by stirring at 85° C. for 1 hour at ambient pressure except in examples 11, 12 and 15 where the temperature was 120° C. Subsequently this mixture was left to cool to ambient temperature (about 22° C.), then the trimerization catalyst was added (in those cases where this catalyst was to be added) followed by normal stirring under ambient conditions for 15 minutes. Finally, this mixture was added to the polyisocyanate under normal stirring and under ambient conditions.

The type and amount of catalyst and anhydride (% by weight on polyisocyanate and polyol) is given in below table.

In the examples indicated with an * the polyol used was Daltocel F526, which already contained the indicated amount of potassium lactate. In the other examples Jeffox WL590 was used as polyol (which does not contain trimerization catalyst) and Catalyst LB or Dabco K15 as catalyst.

Analysis of the product obtained revealed that more than 95% of the phthalic anhydride groups were converted and that the ratio of ester and acid groups formed during this process was about 1.

Examples 1, 3, 5, 8 and 14 are comparative examples.

The table below shows the potlife and the curing time for each mixture.

The potlife is measured as follows:

100 g of a mixture is poured in a plastic cup at ambient temperature; the cup is placed in an insulated container, which is equipped with a temperature recording device; the container is closed and the temperature of the mixture is measured over time; the potlife is the time which has passed since the start of the temperature recording until the temperature rise starts to increase sharply and the mixture starts to gel. The curing time is measured as follows:

50 g of a mixture is poured in an open aluminium mould which has a temperature of 80° C. and an internal surface area of 225 cm². The time is measured until the cured product does not stick anymore.

The isocyanate-reactive mixtures as obtained in the examples according to the present invention showed the following characteristics: 1) the number of carboxylic acid groups: the number of ester groups, both formed in this reaction, was about 1 and 2) more than 90% of the anhydride groups were converted, all as measured via $C^{13}$—NMR.

| Example | Trimerization catalyst Type | Amount | Acid/anhydride Type | Amount | Potlife, minutes | Curing time, minutes |
|---|---|---|---|---|---|---|
| 1* | K-lactate | 0.036 | — | — | 7 | 1 |
| 2* | K-lactate | 0.036 | Phthalic anhydride (PhA) | 0.075 | 113 | 7 |
| 3 | K-acetate | 0.027 | — | — | 10 | 2 |
| 4 | K-acetate | 0.027 | PhA | 0.075 | 66 | 6 |
| 5 | K-octoate | 0.055 | — | — | 13 | 3 |
| 6 | K-octoate | 0.055 | PhA | 0.075 | 60 | 5 |
| 7* | K-lactate | 0.036 | Trimellitic Anhydride | 0.049 | 62 | 7 |
| 8* | K-lactate | 0.036 | Phthalic Acid | 0.084 | 12 | 5 |
| 9 | TMR | 0.075 | PhA | 0.075 | 53 | 9 |
| 10* | K-lactate | 0.036 | PhA[1] | 0.08 | 125 | 10 |
| 11* | K-lactate/K-acetate | 0.036/0.048 | PhA | 0.5 | 278 | 20 |
| 12* | K-lactate/K-acetate | 0.036/0.224 | PhA | 1 | 62 | 6 |
| 13* | K-lactate | 0.036 | PhA | 0.025 | 28 | 5 |
| 14* | K-lactate | 0.036 | PhA | 0.0025 | 14 | 2 |
| 15* | K-lactate | 0.036 | PhA | 0.5 | 4000 | 120 |

[1] The composition also contained 1% by weight (on polyisocyanate and polyol) of internal mould release agent Tego IMR 412T from Goldschmidt
TMR: Dabco TMR ex Air Products which comprises N-hydroxypropyl trimethyl ammonium octoate

EXAMPLE 16

A polyisocyanate composition was made from Suprasec 2020 (85 pbw), Daltocel F526 (15 pbw), potassium lactate (0.036% w based on the polyisocyanate and the polyol) and phthalic anhydride (0.15% w based on the polyisocyanate and the polyol) using the same process as in example 15. The mixture was combined with woven carbon fibres using the resin transfer moulding technique. Nice composite materials were made; the volume fraction of the fibres in the composite was 60%.

EXAMPLE 17

The composition of example 16 was combined with woven glass fibers (w/w mixture/fibers: 37/63). Nice composite materials were made using the resin transfer moulding technique.

EXAMPLE 18

The composition of example 16 was mixed with wood particles (particles/mixture w/w:90/10). A nice wood composite was made from it.

EXAMPLE 19

A nice composite article was made using the polyisocyanate composition of example 10. A glass matt was sprayed with the mixture, placed in a press which was closed. The press had a temperature of 150° C.

After 1 minute the article could be easily removed from the press. The weight ratio of the glass matt and the mixture was 50/50.

EXAMPLE 20

6 non woven glass fiber matts of 15×15 cm were placed in a polyisocyanate composition like the one made in example 2. After the wetted fiber matts were taken out and allowed to leak out for 15 minutes, they were placed on a pile and put in a press which had a temperature of 80° C. and pressed to a thickness of 4 mm for 5 minutes. A nice composite could be demoulded.

EXAMPLE 21 (Comparative)

95 parts by weight Jeffox WL590 and 5 pbw of phthalic anhydride were mixed and reacted at 85° C. for 2 hours while stirring. The mixture obtained was subjected to Infra Red Analysis and showed anhydride peaks at 1775, 1789 and 1851 cm$^{-1}$.

EXAMPLE 22 (Comparative)

When example 21 was repeated with Polyglycol DME500 instead of Jeffox WL590 the same result was obtained. Polyglycol DME500 is a polyethylene glycol dimethylether having a molecular weight of 500 ex Clariant.

EXAMPLE 23

When example 21 was repeated with an additional 0.5% by weight (on polyol and anhydride) of Catalyst LB, the three peaks disappeared and an ester peak at 1725 cm$^{-1}$ appeared.

EXAMPLE 24

When example 23 was repeated using 1% by weight of TMR instead of 0.5% by weight of Catalyst LB, the same happened.

The invention claimed is:
1. A method for making a polyisocyanurate comprising:
   forming an isocyanate-reactive mixture comprising:
      a trimerization catalyst comprising 1-12 carbon atoms; and
      the reaction product of an anhydride and a polyol;
   wherein the polyol has an average equivalent weight of 100-2500 and an average nominal hydroxyl functionality of 2-8;
   wherein the trimerization catalyst is selected from the group consisting of alkali metal carboxylates, which are selected from the group consisting of potassium acetate, potassium hexanoate, potassium ethylhexanoate, potassium octoate, and potassium lactate, quaternary ammonium carboxylates and mixtures thereof, wherein the molar amount of the anhydride ranges from 0.1 to 99% of the hydroxyl equivalent amount of the polyol, and wherein the ratio of the number of carboxylic acid groups to the number of ester groups, both formed in the reaction between the anhydride groups and the polyol, is 0.9-1.1 to 1 and wherein at least 60% of the anhydride groups has been converted;

forming a polyisocyanate composition by adding the isocyanate-reactive mixture to a polyisocyanate compound at a temperature in the ranqe of 5° C. to 45° C.; and forming the polyisocyanurate by heating the polyisocyante composition to a temperature ranging from 50° C. to 350° C.

2. The method according to claim 1 wherein the temperature for forming the polyisocyanurate ranges from 70° C. to 280° C.

3. The method according to claim 1, wherein the anhydride is selected from phthalic anhydride, trimeliitic anhydride, or combinations thereof.

4. The method according to claim 1, wherein the anhydride is phthalic anhydride.

5. The method according to claim 1, wherein the polyol is a polyether polyol having an average nominal hydroxyl functionality of 2-4 and an oxyethylene content of at least 50% by weight calculated on the weight of the polyether polyol.

6. The method according to claim 1, wherein the molar amount of the anhydride ranges from 0.2 to 50% of the hydroxyl equivalent amount of the polyol.

7. The method according to claim 1, wherein the molar amount of the anhydride ranges from 0.3 to 30% of the hydroxyl equivalent amount of the polyol.

8. The method according to claim 1, wherein the amount of trimerization catalyst is 0.002-5% by weight based on the weight of the mixture.

9. The method according to claim 1, wherein the anhydride and the polyol are reacted at ambient pressure and at a temperature ranging from 10 to 140° C. in the presence of the trimerization catalyst.

10. The method according to claim 9, wherein the temperature ranges from 10 to 100° C. in the presence of the trimerization catalyst.

11. The method according to claim 1, wherein the isocyanate-reactive mixture is added to the polyisocyanate composition in such relative amounts that the index of the polyisocyanate composition is 150-15000.

12. The method according to claim 1, wherein the temperature for adding the isocyanate-reactive mixture to a polyisocyanate compound is in the range of 5° C. to 30° C.

13. The method according to claim 1, wherein the polyisocyanate composition is part of a binder composition further comprising a material which is to be bonded, wherein the amount of material which is to be bonded is 0.01-100 times the amount of the polyisocyanate composition.

* * * * *